(12) United States Patent
Passarotto

(10) Patent No.: US 6,491,350 B2
(45) Date of Patent: Dec. 10, 2002

(54) SPOKED BICYCLE WHEEL

(75) Inventor: Maurizio Passarotto, Rovigo (IT)

(73) Assignee: Campagnolo SRL, Vicenza (IT)

( * ) Notice: Subject to any disclaimer, the term of this patent is extended or adjusted under 35 U.S.C. 154(b) by 0 days.

(21) Appl. No.: 09/779,578

(22) Filed: Feb. 9, 2001

(65) Prior Publication Data

US 2002/0047302 A1 Apr. 25, 2002

(30) Foreign Application Priority Data

Oct. 24, 2000 (IT) .......................... TO00A1007

(51) Int. Cl.⁷ ................................. B60B 1/02
(52) U.S. Cl. ................... 301/58; 301/104; 301/110.5
(58) Field of Search ............................ 301/55, 56, 58, 301/59, 95.101, 95.104, 95.106, 110.5, 104

(56) References Cited

U.S. PATENT DOCUMENTS

| | | | |
|---|---|---|---|
| 303,503 A | 8/1884 | Gallup | |
| 337,223 A | 3/1886 | Williams | |
| 339,550 A | 4/1886 | Hudson | |
| 365,091 A | 6/1887 | Owen | |
| 444,430 A | 1/1891 | Gedge | |
| 452,046 A | 5/1891 | Mather | |
| 452,649 A | 5/1891 | Powell | |
| 478,918 A | 7/1892 | Cannon | |
| 543,310 A | 7/1895 | Laube | |
| 560,509 A | 5/1896 | Libbey | |
| 582,486 A | 5/1897 | Rowe | |
| 671,778 A | 4/1901 | Sams | |
| 705,121 A | 7/1902 | Newton | |
| 725,014 A | 4/1903 | Westover | |
| 886,565 A | 5/1908 | Williams et al. | |
| 1,064,066 A | 6/1913 | Funk | |
| 1,135,424 A | * 4/1915 | Ashley et al. | |
| 1,160,203 A | 11/1915 | Scherer | |

(List continued on next page.)

FOREIGN PATENT DOCUMENTS

| | | |
|---|---|---|
| DE | 398372 | 1/1923 |
| DE | 583902 | 8/1933 |
| DE | 155602 | 6/1982 |
| FR | 425 730 | 2/1911 |
| FR | 874 167 | 7/1942 |
| FR | 1 019 285 | 1/1953 |
| FR | 2 378 642 | 8/1978 |
| FR | 2 786 435 A1 | 6/2000 |
| FR | 2 792 250 A1 | 10/2000 |
| GB | 16340 | 12/1866 |
| GB | 4449 | 3/1894 |
| GB | 22441 | 11/1898 |
| GB | 19499 | 9/1899 |
| GB | 9844 | 4/1911 |
| GB | 854546 | 11/1960 |
| JP | 2-77302 | 3/1990 |
| JP | 11 321 201 | 11/1999 |

OTHER PUBLICATIONS

"Bicycling", Australia, May 2000 p. 8.
Bicycling, Apr. 1992, p. 152.
Bicycling, Apr. 1993, pp. 120 & 122.

*Primary Examiner*—Russell D. Stormer
(74) *Attorney, Agent, or Firm*—Volpe and Koenig, P.C.

(57) ABSTRACT

A spoked bicycle wheel includes a rim, a hub having first and second axially spaced apart anchoring portions and a plurality of spokes connected between the rim and the anchoring portions. A first set of spokes is anchored to the first anchoring portions and a second set of spokes is anchored to the second anchoring portions. The spokes of the first set are greater in number than the spokes of the second set.

7 Claims, 2 Drawing Sheets

U.S. PATENT DOCUMENTS

| | | | |
|---|---|---|---|
| 1,160,223 A | | 11/1915 | Wagenhorst |
| 1,450,064 A | | 3/1923 | Dodds |
| 1,475,161 A | | 11/1923 | Wagenhorst |
| 1,476,780 A | | 12/1923 | Van Meter |
| 1,642,207 A | * | 9/1927 | Jones |
| 1,795,574 A | | 3/1931 | Olson |
| 1,923,476 A | * | 8/1933 | Booth |
| 1,933,178 A | * | 10/1933 | Le Jeune |
| 2,937,905 A | | 5/1960 | Altenburger |
| 3,008,770 A | | 11/1961 | Mueller |
| 4,300,804 A | | 11/1981 | Hasebe |
| 4,583,787 A | | 4/1986 | Michelotti |
| 4,626,036 A | | 12/1986 | Hinsbert et al. |
| 4,729,605 A | | 3/1988 | Imao et al. |
| 4,844,552 A | | 7/1989 | Tsygankov et al. |
| 5,061,013 A | | 10/1991 | Hed et al. |
| 5,104,199 A | | 4/1992 | Schlanger |
| 5,445,439 A | | 8/1995 | Dietrich |
| 5,626,401 A | | 5/1997 | Terry, Sr. et al. |
| 5,931,544 A | | 8/1999 | Dietrich |
| 6,024,414 A | | 2/2000 | Dietrich |
| 6,145,938 A | * | 11/2000 | Dietrich |

* cited by examiner

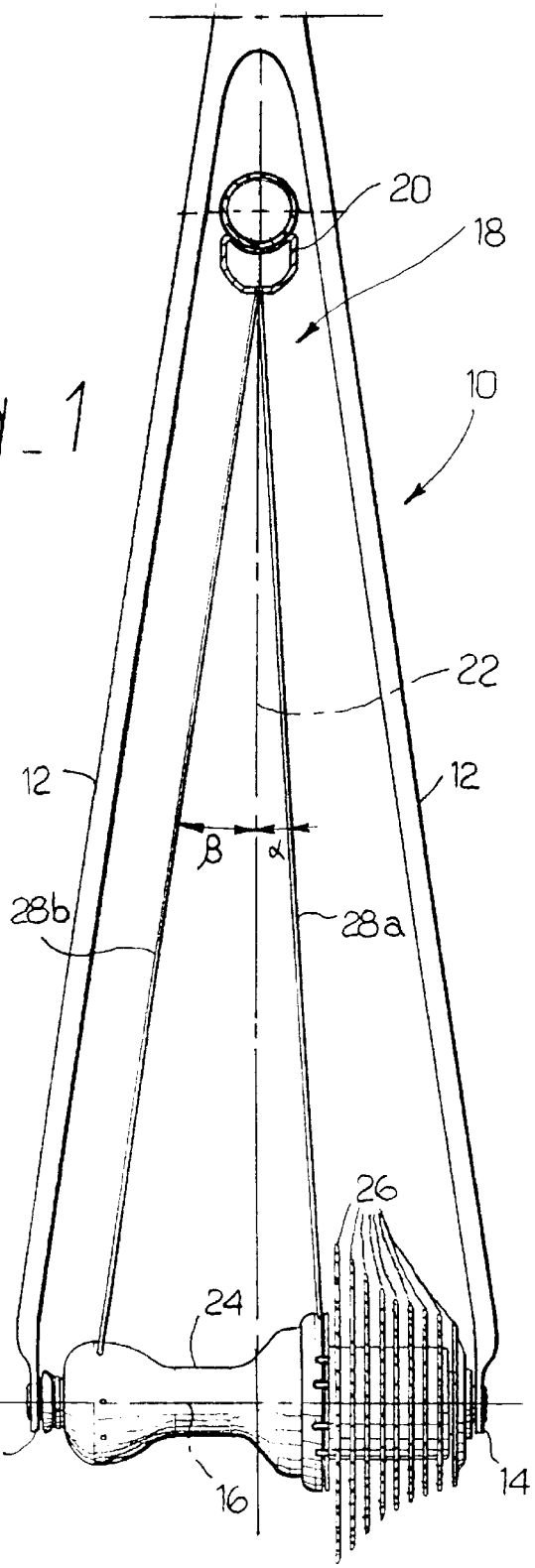

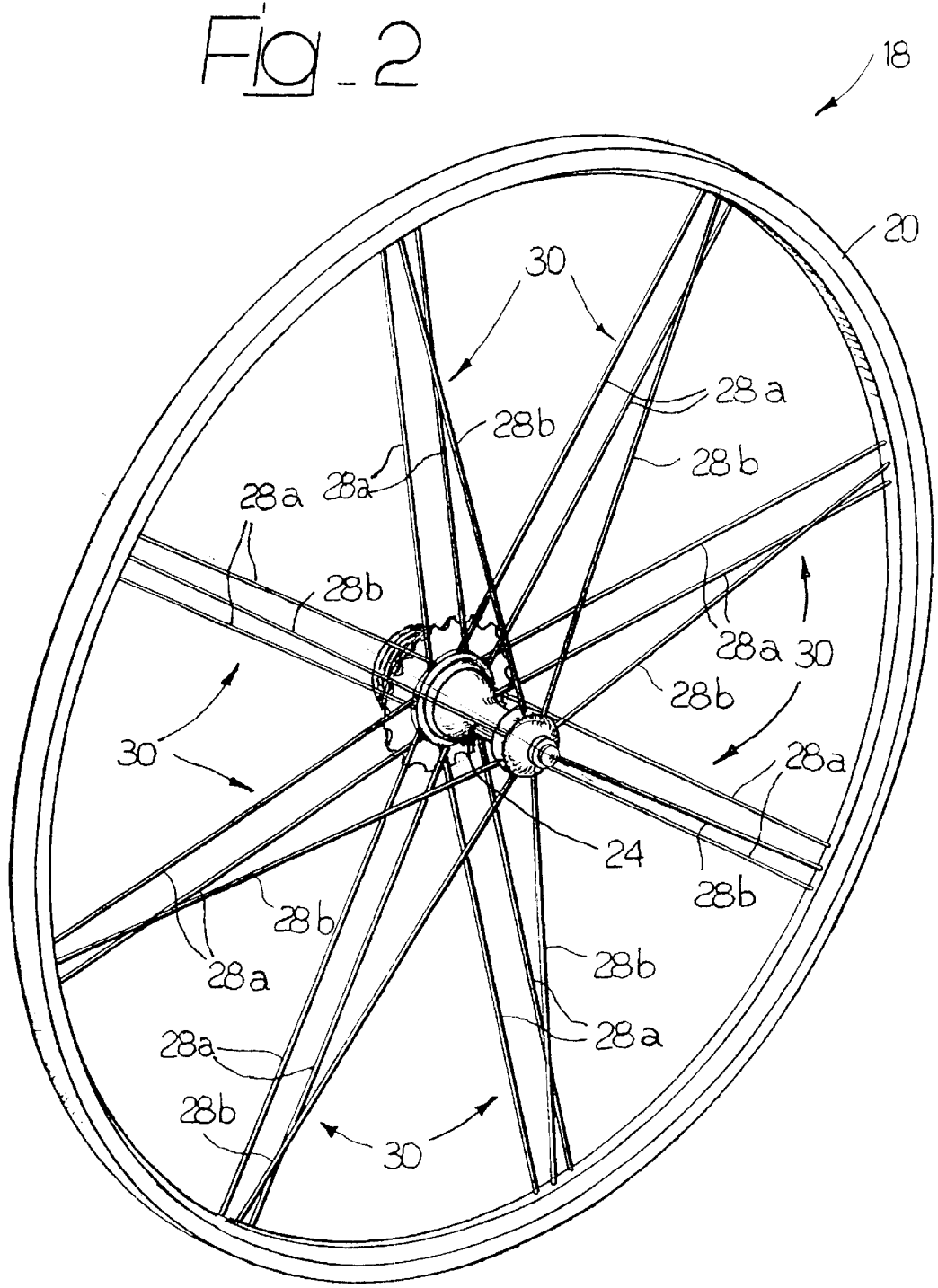
Fig_2

SPOKED BICYCLE WHEEL

BACKGROUND OF THE INVENTION

The present invention relates to a rear bicycle wheel.

FIG. 1 of the annexed drawings illustrates a rear wheel of a known type mounted on the frame of a bicycle 10 having two fork-shaped arms 12 provided at their bottom ends with seats, designated generically by 14, for fixing of a pin defining an axis 16 of transverse rotation. The rear wheel, designated as a whole by 18, comprises a rim 20 having a median plane 22 set in a central position with respect to the arms 12 and the seats 14 for attachment of the frame 10. The wheel 18 comprises a hub 24 that carries a set of sprockets 26 set coaxially with the hub 24. The rim 20 and the hub 24 are connected together by means of one first set of spokes and one second set of spokes, designated, respectively, by 28a and 28b. The spokes 28a of the first set are anchored along one side of the hub 24 adjacent to the sprocket set 26, whilst the spokes 28b of the second set are anchored to the hub 24 on the side of the latter further away from the sprocket set 26.

On account of the encumbrance of the sprocket set 26 in the direction of the transverse axis 16, the spokes 28a, 28b have a different inclination with respect to the median plane 22 of the wheel 18. In FIG. 1, the angles of inclination of the spokes 28a and 28b with respect to the median plane 22 are designated, respectively, by $\alpha$ and $\beta$. The difference between the angles $\alpha$ and $\beta$ is greater, the greater is the axial encumbrance of the sprocket set 26.

In traditional solutions, the fact that the spokes 28a and 28b have a different inclination with respect to the median plane 22 means that the said spokes are subjected to different tensioning forces. In particular, the tensioning force of the spokes 28a will have to be considerably higher than the tensioning force of the spokes 28b in order to keep the rim 20 centred with respect to the median plane 22 of the wheel. If the mean tensioning forces of the spokes 28a and 28b are respectively designated by $F_a$ and $F_b$, in order to have correct centring of the rim 20 with respect to the median plane 22, the components of these forces in the direction parallel to the axis of rotation of the wheel must be equal and opposite to one another.

The main drawback of the known solution previously described lies in the fact that the spokes of the wheel that are adjacent to the sprocket set undergo a very high tensioning force and are much more subject to the risk of failure as compared to the spokes located on the side of the wheel opposite to the sprocket set.

SUMMARY OF THE INVENTION

The purpose of the present invention is to provide a rear bicycle wheel that is free from the aforementioned drawback.

In accordance with the present invention, the above purpose is achieved by a bicycle wheel having the characteristics that form the subject of the main claim.

The characteristics and advantages of the present invention will emerge clearly from the ensuing detailed description, which is provided purely by way of non-limiting example, with reference to the attached drawings in which:

BRIEF DESCRIPTION OF THE DRAWINGS

FIG. 1 already described previously, is a partial axial section of a rear wheel mounted on the frame of a bicycle;

FIG. 2 is a perspective view of an embodiment of a wheel according to the invention; and FIG. 3 is a partial perspective view of the wheel according to the invention.

In FIGS. 2 and 3 the items corresponding to the ones previously described are designated by the same reference numbers.

DETAILED DESCRIPTION OF THE INVENTION

In the wheel 18 according to the present invention the spokes 28a of the first set are greater in number than the spokes 28b of the second set. In the embodiment illustrated in the figures, the spokes 28a are twice as many as the spokes 28b of the second set. Preferably, the spokes 28a and 28b are grouped together in a plurality of sets of three spokes 30 set at equal distances apart. Each set of three spokes 30 comprises two spokes of the first set 28a and one spoke of the second set 28b, the latter being in a central position between the respective two spokes of the first set 28a. The two spokes 28a of each set of three spokes 30 are preferably parallel to one another, and the spoke 28b of the same set of three spokes 30 is contained in a radial plane equidistant from the spokes 28a. The ways in which the spokes 28a, 28b are fixed to the hub 24 and to the rim 20 may be of any type whatsoever.

As may be seen in FIG. 2, the wheel 18 assumes, from the aesthetic point of view, the configuration of a "spoked" wheel, in which, in actual fact, each spoke is made up of a set of three spokes 30. The number of sets of three spokes 30 may be varied with respect to the embodiment illustrated in FIG. 2. For example, wheels may be built having 5, 6, 7, 8, 9, or 10 "spokes", i.e., sets of three spokes, having, respectively 15, 18, 21, 24, 27, and 30 spokes in all.

The solution according to the present invention substantially enables the tensioning force of the spokes 28a to be halved with respect to that of the spokes of the second set 28b, with a consequent considerable reduction in the risk of failure of the spokes adjacent to the sprockets, which, in traditional solutions, are more subject to failure.

Of course, without prejudice to the principle of the invention, the details of construction and the embodiments may be varied widely with respect to what is described and illustrated herein purely by way of example, without thereby departing from the scope of the present invention as defined in the ensuing claims.

What is claimed is:

1. A spoked wheel for a bicycle comprising a rim, a hub and a plurality of spokes connected to the rim and the hub at opposite ends of the spokes, wherein a first set of spokes is anchored to a first anchoring portion of the hub and a second set of spokes is anchored to a second anchoring portion of the hub spaced from the first anchoring portion, wherein the spokes of the first set have twice as many spokes as the second set, wherein the spokes are grouped in sets of three spokes set at equal distances apart, each set of three spokes comprising two spokes of the first set and one spoke of the second set and wherein the spokes of the first set of each set of three spokes are substantially parallel to one another.

2. A wheel according to claim 1 wherein the spoke of the second set of each set of three spokes is contained in a radial plane set in a central position with respect to the spokes of the first set of the same set of three spokes.

3. A spoked wheel for a bicycle comprising a rim, a hub and a plurality of spokes connected to the rim and the hub at opposite ends of the spokes, wherein a first set of spokes is anchored to a first anchoring portion of the hub and a second set of spokes is anchored to a second anchoring portion of the hub spaced from the first anchoring portion, wherein the spokes of the first set are twice as many as the spokes of the second set and wherein the tensioning force of the spokes of the first set is approximately half that of the tensioning force of the spokes of the second set.

4. A spoked wheel according to claim 3, wherein said spokes are grouped in sets of three spokes.

5. A spoked wheel according to claim 4, wherein the spokes of each set of three spokes are at equal distances apart.

6. A spoked wheel according to claim 4, wherein each set of three spokes comprises two spokes of the first set and one spoke of the second set.

7. A spoked wheel according to claim 4, wherein the spokes of the first set of each set of three spokes extend on opposite sides of a plane containing the spoke of the second set and the hub axis.

* * * * *